United States Patent [19]

Chinchen

[11] 4,142,988

[45] Mar. 6, 1979

[54] CARBON MONOXIDE SHIFT PROCESS

[75] Inventor: Godfrey C. Chinchen, Stockton-on-Tees, England

[73] Assignee: Imperial Chemical Industries Limited, London, England

[21] Appl. No.: 735,892

[22] Filed: Oct. 26, 1976

[30] Foreign Application Priority Data

Nov. 4, 1975 [GB] United Kingdom ............... 45757/75

[51] Int. Cl.$^2$ ............................................. C01B 2/10
[52] U.S. Cl. ..................................... 252/373; 423/656
[58] Field of Search ................. 252/373; 423/655, 656

[56] References Cited

U.S. PATENT DOCUMENTS

| | | | |
|---|---|---|---|
| 2,829,113 | 4/1958 | Barry et al. | 252/376 |
| 3,345,136 | 10/1967 | Finnevan et al. | 252/373 UX |
| 3,595,619 | 7/1971 | Slater et al. | 252/373 |
| 3,652,454 | 3/1972 | Robin et al. | 252/373 |
| 3,850,840 | 11/1974 | Aldridge et al. | 423/655 |
| 3,850,841 | 11/1974 | Aldridge et al. | 423/655 |
| 4,021,366 | 5/1977 | Robin et al. | 252/373 |

*Primary Examiner*—Howard T. Mars
*Attorney, Agent, or Firm*—Cushman, Darby & Cushman

[57] ABSTRACT

A carbon monoxide shift process at a pressure of at least 15 atm. abs. is carried out over an oxidic and/or sulphidic catalyst of a specified level of activity in a 2-zone bed. The upstream zone has an outlet temperature in the range 350°–400° C. and the downstream zone has a higher outlet temperature, for example up to 550° C. The catalyst in the upstream zone differs from the catalyst in the downstream zone by containing more catalytic material per unit volume and/or by having a lower area/volume ratio and/or by having a lower porosity.

8 Claims, No Drawings

CARBON MONOXIDE SHIFT PROCESS

This invention relates to a carbon monoxide shift process and a catalyst system therefor.

The "shift" process by which carbon monoxide reacts with a catalyst to give carbon dioxide and hydrogen has been industrially used for many decades. Among the commonest catalysts used has been iron oxide, usually promoted with chromium oxide, at temperatures usually in the range 350°-550° C. Although the process over this catalyst is long-established, we have found that it and similar processes over zinc oxide or other oxides from Groups VIA and/or VIII of the Periodic Table can be improved, especially when they are to be operated at moderately high pressures, such as 15 atm and above.

According to the invention a process for reacting carbon monoxide with steam to give carbon dioxide and hydrogen is carried out over a heterogeneous catalyst containing oxides and/or sulphides of one or more metals selected from zinc and the metals of Groups VIA and VIII of the Periodic Table at a pressure of at least 15 atm. abs. the catalyst having an activity in the range 0.05 to 0.2 reciprocal seconds measured as hereinafter specified and being present in a bed comprising an upstream zone having an outlet temperature in the range 350°-400° C. and a downstream zone having an outlet temperature higher than that of the upstream zone, the catalyst in the zones differing in one or more of the following ways:

(a) the upstream zone contains more catalytic material per unit volume than the downstream zone;

(b) the upstream zone catalyst has a lower area to volume ratio than the downstream zone catalyst; and (c) the upstream zone catalyst has a lower porosity than the downstream zone catalyst.

In this specification the Periodic Table referred to is set out in "Abridgments of Specifications" published by the UK Patent Office. Where a percentage composition of a catalyst is quoted, this will be by weight on the constituents of the catalyst that are stable and non-volatile in air at 900° C. unless otherwise stated.

The activity of the catalyst is defined as the first-order velocity constant K for the reaction of a mixture of carbon monoxide (10 parts by volume), carbon dioxide (10 parts by volume), hydrogen (80 parts by volume) and steam (10 parts by volume) at 350° C., 30 ata pressure. In such a mixture the rate of reaction of carbon monoxide is expressed by the equation $$dP/dt = K(P - P^{eq})$$

where $P$ = partial pressure of carbon monoxide
$P^{eq}$ = partial pressure of carbon monoxide that would be present at equilibrium.

In integrated form this equation becomes $$K = SV \log_e \frac{1}{1 - \frac{C}{C_e}}$$

where $K$ = rate constant in reciprocal seconds
$SV$ = space velocity of the reacting gas in volumes of gas passing over unit volume of catalyst per second as measured under reaction conditions
$C$ = percentage conversion of carbon monoxide
$C_e$ = percentage conversion of carbon monoxide at equilibrium.

The velocity constant can, of course, be calculated from data obtained from the reaction under different conditions.

It is to be noted that the conditions in which $K$ is determined for the purpose of this definition do not limit the range of conditions in which the process is to be operated.

The specified range of activity defines the range of catalysts whose performance is improved by the 2-zone principle.

The invention includes also a process in which the activity of the catalyst is initially outside the specified activity range but is known to change after a period of use to a level within the specified range. One example of such a process uses an iron-chrome catalyst having initially a higher activity. Another example uses an iron-chrom catalyst having initially a lower activity as the result of temporary poisoning by sulphur. Yet another example uses an oxidic molybdate or tungstate catalyst which has initially a lower activity but whose activity will increase as the result of absorbing sulphur from the reactant gas. The line of demarcation between the two zones may for the same reason change during operation of the process. Therefore the invention includes also a catalyst system comprising the two zones defined with respect to the specified characteristics of the catalysts present.

The invention further includes a process or system having an intermediate zone charged with catalyst having one or more of the specified properties at a level intermediate between those of the two main zones.

The metals whose oxides and/or sulphides are present in catalysts to be used in the process are particularly chromium, molybdenum and tungsten in Group VIA and iron, cobalt and nickel in Group VIII, of the Periodic Table. Preferably a compound of a Group VIA metal and of a Group VIII metal are present together, for example in the combinations iron oxide and chromium oxide (referred to hereinafter as "iron-chrome") and sulphided molybdates and tungstates of cobalt and nickel. (These are conventional names for combinations of oxides in which true molybdates or tungstates may or may not be present). Other active oxides that may be present include zinc oxide in combination with a Group VIA oxide, especially chromium oxide. The free Group VIII metals may be present, but usually this applies only to sulphided catalysts or catalysts containing molybdenum or tengsten, since otherwise there os a tendency to methane-formation as a side reaction. If desired, the two zones can contain dissimilar catalysts; for example a molybdate catalyst can be followed by an iron-chrome catalyst. The invention is especially applicable to the process when carried out over an iron-chrome catalyst, in which the chromium oxide content (calculated as $Cr_2O_3$) on the total of chromium oxide and iron oxide (calculated as $Fe_2O_3$) is in the range 5–15%.

In the upstream zone the quantity of catalytic material per unit volume of catalyst-filled space depends on which of the possible high temperature shift catalysts is used. Thus, for example, using the iron-chrome catalyst, the catalyst particles usually and preferably consist almost entirely of those oxides, with little if any materials such as binders or support materials. The same applies to zinc oxide and chromium oxide catalysts. On the other hand catalysts of the molybdate and tungstate type usually contain over 50% by weight of support material and, for example, 1-10% of cobalt or nickel monoxide and 5-25% of molybdenum or tungsten trioxide. Preferably the level of chromium and the iron and/or zinc constituents, calculated as the total of those oxides in the catalysts as charged to the reactor, is at least 1.2, especially at least 1.4, kilograms per liter for the catalysts containing those oxides. A practical upper limit appears to be about 2.5. Such levels are to be proportionately lower for the molybdate and tungstate type catalysts: for the upstream zone such catalysts typically contain 4-10% of cobalt or nickel monoxide and 10-25% of molybdenum or tungsten trioxide. The quantity of catalytic material per unit volume of catalyst-filled space can be attained by the use of catalyst particles of relatively high specific gravity, for example at least 2.0, especially at least 2.5. The upper limit is believed to be about 4.0, to allow sufficient porosity.

In the downstream zone the level of chromium, iron and zinc constituents, calculated as the total of those oxides in the catalysts as charged to the reactor, can be less than 1.4, for example in the range 0.8 to 1.2, for the catalysts containing chromium oxide with zinc oxide or iron oxide. Proportionately less can be present when using molybdate and tungstate type catalysts; and these can typically contain 1-6% of cobalt or nickel monoxide and 5-15% of molybdenum or tungsten trioxide. Whichever type of catalyst is present, the support may comprise for example magnesia, alumina, aluminosilicates, magnesium aluminate, magnesium silicate and zinc aluminate, and (instead or in addition) hydraulic cements such as calcium aluminates and/or silicates.

The area to volume ratio of the catalyst in the upstream zone is preferably up to 0.85 reciprocal millimeters ($mm^{-1}$). The lower practical limited appears to be about 0.3 $mm^{-1}$ and preferably it is at least 0.5 $mm^{-1}$. Such values are typical of catalyst particles having all their dimensions greater than 7 mm, with a practical upper limit of 20 mm and preferred upper limit of 12 mm. Particles in these size ranges are large enough to resist mechanical breakdown in use, especially at the bed inlet where they are affected by extraneous matter entering from preceding reaction stages. The spaces between such particles are also large enough to ensure that obstruction of gas flow through the catalyst bed by solid material entering it from preceding stages is a less serious problem than when particles of smaller area to volume ratio are used.

In the downstream zone the area to volume ratio of the catalyst, if it is of the compounded type (that is, made by agglomerating powdered constituents), is preferably over 0.85 $mm^{-1}$. The upper limit is set by the need to avoid too high a pressure-drop through the catalyst bed and also the high cost and lower mechanical strength that go with the smaller catalyst particles necessary; a suitable upper limit is 3.0 and advantageous results are obtained in the range 1.0 to 2.0. Suitably the catalyst particles in this zone, (unless they have re-entrant surfaces) have all their dimensions less than 7 mm, especially under 6 mm, with no limit on the ratio of different dimensions for a given particle. The lower limit in practice is about 2 mm owing to the expense of making very small particles. If the particles have re-entrant surfaces, for example if they have indentations or protrusions as in our UK Pat. No. 1 323 064, the particle dimensions can be correspondingly greater than 7 mm, for example up to 8 mm.

Using particles having the above area to volume ratios the geometrical area in $cm^2$ provided per ml of catalyst-filled space is preferably up to 5.5 for the upstream zone, with a lower practical limit about 2.0 and a preferable lower limit 3.3. In the downstream zone the geometrical area is preferably over 5.5 $cm^{-1}$ per ml of catalyst-filled space and suitable up to 20, with advantageous results in the range 6.5 to 13.0.

The downstream zone catalyst may be of the impregnated type, that is, made by applying a solution or suspension of active material or precursor thereof to a support that has already been shaped. Since in such catalysts the active material is concentrated at the external surfaces of the support the effective volume of their active portions is small and their area-to-volume ratio correspondingly great.

As further alternatives the downstream zone catalyst particles may have a high area-to-volume ratio owing to the presence of through-passages, as in rings or honeycombs.

In the upstream zone the porosity of the catalyst is not critical and can be at quite low levels consistent with the high specific gravity preferred. Typical porosities are in the range 20-40% v/v. In the downstream zone, however, porosities of over 40% v/v are preferred, especially up to 60% v/v.

The particles in the upstream zone are conveniently solid cylinders, since cylinders of high specific gravity and mechanical strength can be made by compression-pelleting. If spheres of sufficiently high specific gravity and strength are available, these make it possible to provide at a given voidage a greater weight of catalytic material per unit volume than is possible using cylinders, and therefore such spheres may be preferred for the upstream zone.

Conveniently the downstream zone particles are also cylindrical, but the cylinders may be hollow or indented or protrusioned. Spheres are less desirable owing to their lower voidage and higher pressure-drop, unless this is counterbalanced by low density and high porosity. Since high density is not required, the downstream zone catalyst particles can be made by non-compressive methods such as wet-granulation or extrusion. In making catalysts for this zone, fugitive porosity-forming substances such as organic polymers may be present.

In the downstream zone the gas flows preferably at a high linear velocity, especially if the operating pressure is above 25 atm and the space velocity, as defined hereinafter, is relatively low, for example in the range 1000-3000 $hour^{-1}$. If the linear velocity is not high enough the rate of reaction is limited by diffusion through the gas film at the surface of the particles as well as be diffusion within the catalyst particles. In such conditions it is advantageous to have the downstream zone as long and as narrow as is practicable and/or recycle some reacted gas to it.

The two zones may be constituted by two parts of a single catalyst bed or may be in distinct beds, possibly in distinct reactors. The ratio of the volumes of the upstream zone and the downstream zone depends on the inlet temperature of the upstream zone, but is usually between 1:4 and 4:1. The total space velocity, measured as the volume of gas (including steam) calculated to 20° C., 1 atm pressure, passing over unit volume of catalyst per hour, is suitably in the range 1000-100000 $hour^{-1}$. The pressure is preferably over 25 atm and up to 50 atm abs.

The process of the invention can be used in conjunction with any of the usual sources of reactant gas and any of the usual uses of reacted gas. Thus for example the reactant gas may be derived from a hydrocarbon by catalytic steam reforming or partial oxidation; in this event it is substantially sulphur-free and an iron-chrome or zinc chromite catalyst may be normally used. If the reactant gas is derived from non-catalytic gasification for example by partial oxidation, of carbonaceous materials, which may range from natural gas to coal, if normally contains sulphur compounds and is either substantially desulphurised and shifted over one of the above-mentioned catalysts or else is at most partly desulphurised and shifted over a molybdate or tungstate type catalyst. Temperature control arrangements in the shift process are chosen so as to take account of the higher carbon monoxide content and hence stronger heat evolution in the gas derived from non-catalytic gasification. Usually the process is carried out in substantially adiabatic conditions, so that the temperature rises from the inlet towards the outlet of each zone.

The characteristics chosen for the catalyst in the upstream zone result in greater activity at the lower part of the temperature range used in the high temperature shift process than was previously available, and thus the gas entering the process can be cooler than was previously thought necessary, for example down to 300°–350° C. instead of 330°–380° C. Consequently more heat can be abstracted from the gas before the shift stage and recovered as high pressure steam.

Uses of the reacted gas include hydrogen production and ammonia synthesis, in which event the gas, if sulphur-free, is usually passed to a low-temperature shift stage at 180°–280° C. over a copper-containing catalyst, followed by carbon dioxide removal and conversion of residual carbon oxides to methane. Alternatively the carbon oxides may be removed cryoscopically. Another important use is in the production of town gas from liquid hydrocarbons by catalytic steam reforming or partial oxidation, in which the process of the invention is used to decrease the carbon monoxide content of the gas to a non-toxic level such as under 3% by volume, and a carbon dioxide removal step usually follows the shift stage. The reacted gas, if sulphur-free, may be shifted by the process of the invention in conjunction with subsequent carbon dioxide removal to adjust its content of carbon oxides and hydrogen to that required for the synthesis of methane, methanol or higher hydrocarbons and their derivatives.

EXAMPLE 1

Process conditions

A carbon monoxide shift process was operated under the following conditions:
Pressure 31 atm abs.
temperature in the range 310°–450° C. (approximately isothermal reactor)
space velocity 5000 hour$^{-1}$ dry (i.e. 1.4 sec$^{-1}$) (calculated to 20° C., 1 atm pressure)
feed gas (dry) CO 10%, $CO_2$ 10% $H_2$ 80%, by volume
steam ratio 1.09 by volume
catalyst volume 350 ml Each catalyst used was a compounded catalyst containing $Fe_2O_3$ 85 to 90% w/w, $Cr_2O_3$ 7 to 9% as charged to the reactor, in the form of cylindrical pellets made by dry-compressing the mixed oxides in the presence of a pelleting lubricant.

At the start the catalyst was subjected to the gas mixture, including steam, at 300° C. for 24 hours to reduce its iron oxide (initially $Fe_2O_3$) to $Fe_3O_4$ and to make sure that all its content of chromium oxides was in the trivalent state. Then the carbon monoxide content of the outlet gas was measured and the values were used to calculate first order velocity constants for disappearance of carbon monoxide, by means of the equation quoted hereinbefore.

(a) Effect of area-to-volume ratio on activity

Two catalysts A and B made by compressing the iron oxide/chromium oxide mixture into pellets of different sizes were compared.

(b) Effect of high specific gravity at various temperatures

For this run catalyst C having about 50% greater activity at 350° C. was tested.

The activities K determined in operations (a) and (b) are shown in Table 1.

TABLE 1

| Catalyst | | | | Temperature, ° C | | | | | | |
|---|---|---|---|---|---|---|---|---|---|---|
| SG | Length mm | diam mm | area/vol mm$^{-1}$ | 310 | 330 | 350 | 370 | 400 | 425 | 450 |
| A 2.2 | 3.6 | 5.4 | 1.3 | 0.017 | 0.043 | 0.092 | 0.190 | 0.404 | 0.610 | 1.80 |
| B 2.1 | 11.0 | 8.5 | 0.65 | 0.017 | 0.043 | 0.097 | 0.154 | 0.256 | 0.358 | 0.565 |
| C 2.5 | 3.6 | 5.4 | 1.3 | 0.031 | 0.072 | 0.140 | 0.262 | NA | NA | 0.954 |

From the comparison of A with B it is evident that these two catalysts are about equal in activity from 310° to about 360° C., despite the difference in pellet size. Above 400° C., however, catalyst B is substantially less active. It follows that in order to obtain high conversion of carbon monoxide with high resistance to mechanical breakdown and blockage in a typical industrial scale process having an inlet temperature under 350° C. and an outlet temperature over 400° C., the catalyst bed should consist of B in an upstream zone in which the temperature is rising to about 380° C. and of A in a downstream zone above 380° C.

From the comparison of C with A it is evident that, whereas C is almost twice as active as A at 310° C., it is no more active than A at 450° C. The high specific gravity would thus be of advantage in the low temperature upstream zone of a shift process but not in the high temperature downstream zone.

EXAMPLE 2

Effect of quantity of active material per unit of volume

The procedure of Example 1 was repeated at up to 370° C. using two commercially available iron-chrome catalysts D and E and comparing them with catalyst C, which is also commercially available. The results are shown in Table 2.

TABLE 2

| Catalyst | | | | Temperature, ° C | | | |
|---|---|---|---|---|---|---|---|
| Specific Gravity | length mm | diam mm | a/v mm$^{-1}$ | 310 | 330 | 350 | 370 |
| C 2.5 | 3.6 | 5.4 | 1.3 | 0.031 | 0.072 | 0.140 | 0.262 |
| D 2.2 | 4.2 | 6.5 | 1.09 | 0.027 | 0.060. | 0.125 | 0.225 |

TABLE 2-continued

| Catalyst | | | | Temperature, °C | | | |
|---|---|---|---|---|---|---|---|
| Specific Gravity | length mm | diam mm | a/v mm$^{-1}$ | 310 | 330 | 350 | 370 |
| E 1.9 | 6.0 | 6.0 | 1.00 | 0.022 | 0.055 | 0.104 | 0.194 |

Recalling from Example 1 that at temperatures under about 360° C. the activity of a given catalyst does not depend on particles size, it is evident that the activity depends linearly on the specific gravity of the catalyst and thus on the quantity of active material per unit volume. Thus it is advantageous to use a high quantity of active material in a low temperature upstream zone of the process.

I claim:

1. A process for reacting carbon monoxide with steam to give carbon dioxide and hydrogen over a heterogeneous catalyst consisting essentially of oxides of chromium, iron or mixtures thereof at a pressure of at least 15 atm. abs, the catalyst having an activity in the range 0.05 to 0.2 reciprocal seconds measured according to the equation $$K = SV \log_e \frac{1}{1 - \frac{C}{C_e}}$$

where
$K$ = rate constant in reciprocal seconds
$SV$ = space velocity of the reacting gas in volumes of gas passing over unit volume of catalyst per second as measured under reaction conditions
$C$ = percentage conversion of carbon monoxide
$C_e$ = percentage conversion of carbon monoxide at equilibrium and being present in a bed comprising an upstream zone having an outlet temperature in the range 350°–400° C. and a downstream zone having an outlet temperature higher than that of the upstream zone, the catalysts in the zones differing in one or more of the following ways:
 (a) the upstream zone contains more catalytic material per unit volume than the downstream zone;
 (b) the upstream zone catalyst has a lower area to volume ratio than the downstream zone catalyst; and
 (c) the upstream zone catalyst has a lower porosity than the downstream zone catalyst.

2. A process according to claim 1 in which the catalyst of the upstream zone contains chromium oxide and an oxide of iron at a level of at least 1.4 kilograms per liter of catalyst-filled space.

3. A process according to claim 2 in which the catalyst of the downstream zone contains chromium oxide and an oxide of iron at a level in the range 0.8 to 1.2 kilograms per liter of catalyst-filled space.

4. A process according to claim 1 in which the area to volume ratio of the catalyst in the upstream zone is up to 0.85 mm$^{-1}$.

5. A process according to claim 4 in which the area to volume ratio of the catalyst in the downstream zone is in the range 1.0 to 2.0 mm$^{-1}$.

6. A process to claim 4 in which the catalyst in the upstream zone is in the form of particles having all their dimensions in the range 7–12 mm and provides a geometric area in the range 3.3 to 5.5 cm$^2$ per ml of catalyst-filled space.

7. A process according to claim 5 in which the catalyst in the downstream zone is in the form of particles having all their dimensions under 7 mm and provides a geometric area in the range 6.5 to 13.0 cm$^2$ per ml of catalyst-filled space.

8. A process according to claim 1 in which the porosity of catalyst in the upstream zone is in the range 20–40% v/v and the porosity of the catalyst in the downstream zone is in the range 40–60% v/v.

* * * * *